H. WILLARD.
Scale-Beam.
No. 223,787. Patented Jan. 20, 1880.
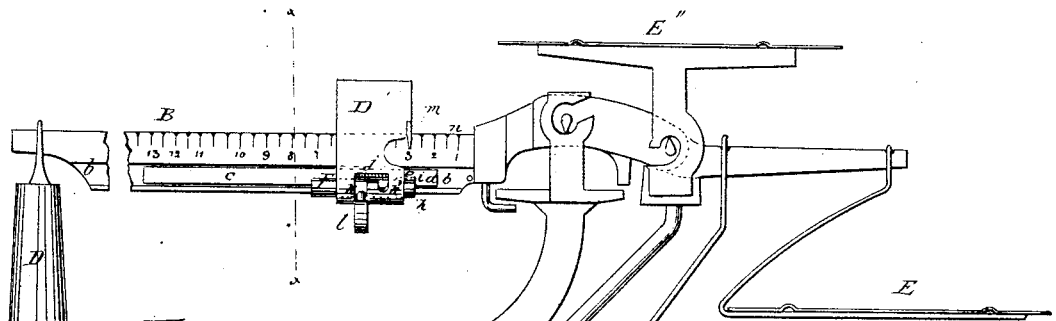
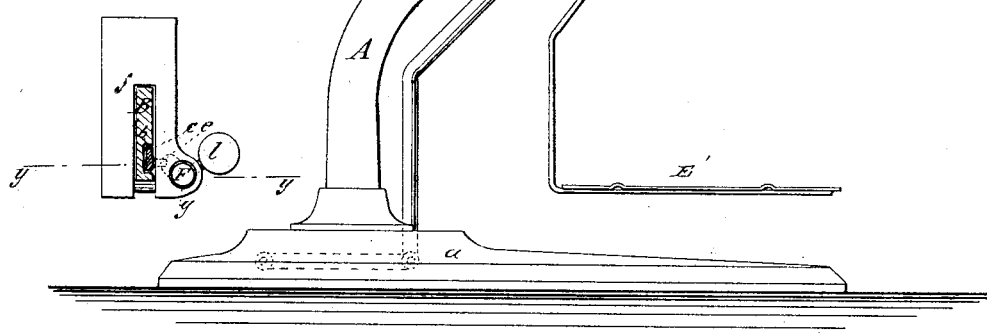
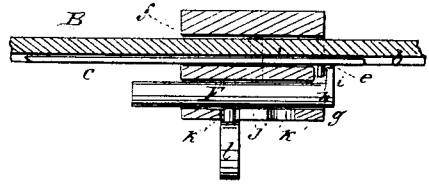
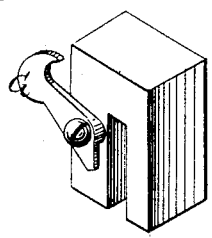
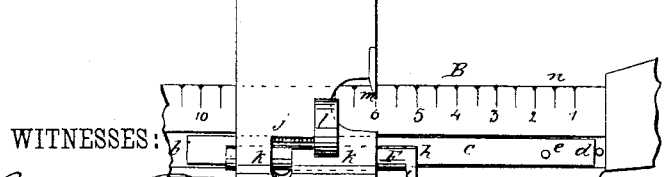
WITNESSES:
Chas. Nidd.
C. Sedgwick
INVENTOR:
H. Willard
BY Munn & Co
ATTORNEYS.

UNITED STATES PATENT OFFICE.

HOSEA WILLARD, OF VERGENNES, VERMONT, ASSIGNOR TO HIMSELF AND FREDERICK W. COE, OF SAME PLACE.

SCALE-BEAM.

SPECIFICATION forming part of Letters Patent No. 223,787, dated January 20, 1880.

Application filed October 14, 1879.

*To all whom it may concern:*

Be it known that I, HOSEA WILLARD, of Vergennes, in the county of Addison and State of Vermont, have invented a new and useful Improvement in Scales, of which the following is a specification.

The invention relates to improvements in the weighing-scales for which Letters Patent No. 204,869 were granted to me on the 11th day of June, A. D. 1878; but the invention is also applicable to other weighing-scales of ordinary construction.

The object of my invention is to facilitate the weighing of articles on the same scale by different systems of weighing—as, for instance, by the ordinary avoirdupois system and metric system, by avoirdupois and troy weights, net and gross weights, &c.

In the accompanying drawings, Figure 1 is a side elevation of a weighing-scale provided with my improvements. Fig. 2 is a cross-section of the scale-beam on line $x$ $x$, with an end view of the sliding poise. Fig. 3 is a horizontal section of the beam and sliding poise, taken on line $y$ $y$ of Fig. 2. Fig. 4 is a side view of the scale-beam, poise, and attachments for changing the system of weighing; and Fig. 5 represents a poise for the beam of an ordinary weighing-scale.

Similar letters of reference indicate corresponding parts.

The invention is shown applied to a scale provided with a number of dishes suspended from different points on the scale-beam, and representing or corresponding with different weights, so that the weight of an article may be ascertained by placing it in one or more of said dishes, as described in my Letters Patent above referred to.

Referring to the drawings, A is the standard or pedestal, rising from a foot, $a$. B is the pivoted scale-beam. D is the stationary poise at the end of the scale-beam. D' is the sliding poise on said beam; and E E' E'' are the several dishes suspended from the scale-beam, for the purpose described in my said patent.

In the side of the scale-beam B, below the graduation-figures, is made a longitudinal groove, $b$. In groove $b$ is placed a sliding bar, $c$, of a length proportionate to the length of the beam B. Bar $c$ is dovetailed in groove $b$, and is held under sliding poise D', so as not to interfere with the movement of said poise. Near the end $d$ of bar $c$ is a stud or pin, $e$.

In the lower part of sliding poise D', outside of the socket $f$, through which the beam B is passed, is a hole or socket, $g$, parallel to the scale-beam B. In socket $g$ is placed a sliding bolt, F, slightly longer than the poise, and having at the end $h$ a lip, $i$.

In the walls of poise D' is a horizontal slot, $j$, leading through to socket $g$. At the ends of this slot are downwardly-projected recesses $k k'$. A thumb-piece, $l$, is passed through slot $g$ and screwed into or otherwise fastened to bolt F, for the purpose of sliding said bolt forward and back in said socket, and, by dropping into one of the recesses $k$ $k'$, holding said bolt in the position to which it is moved.

Recess $k$ is sufficiently deep to allow the thumb-piece $l$ to drop down and turn the bolt F, so as to throw the lip $i$ toward the bar $c$, behind the stud $e$, so that when the sliding poise D' is moved out on the beam it will carry bar $c$ with it. When the thumb-piece $l$ is moved to the recess $k'$, which is shallower than $k$, it holds the bolt F in such a position as to throw the lip $i$ down and away from the bar $c$, and out of engagement with stud $e$, whereby the sliding poise can be moved back and forth on beam B independently of bar $c$.

The operation of my invention is as follows: The scale above described is made for the avoirdupois and metric systems, and each of the notches in the beam represents a postal letter rate of one-half ounce, or fifteen grams. When it is wished to weigh the matter by avoirdupois weight, the bolt F is thrown back until the thumb-piece $l$ is in the recess $k'$. The poise D' can now be moved back and forth on the beam B, in the usual manner, independently of bar $c$, which is pushed back in groove $b$ as far as it will go.

To change the scale for weighing by the metric system the sliding poise D' is pushed back on the beam until its knife-edge $m$ rests in the one-half ounce or fifteen-gram notch at $n$, and the bolt F is pushed forward until the thumb-piece $l$ falls into the recess $k$, and the lip $i$ is thereby placed behind the stud $e$, as shown in Fig. 3. This adjustment increases the leverage of the poise D′ sufficiently to make up the difference between the two systems of weight, and also compensates, in the metric system, to which the scale is now adjusted, for the extra weight of the additional dishes E′ E″.

When a greater weight than one letter rate is to be indicated, and the poise D′ is moved out on bar B, the sliding bar $c$ is carried with the poise D′, and furnishes the additional weight to the scale-beam B necessitated by the changed system.

The bolt F is only applied to the poise D′ when the invention is used in connection with my said patented scale having a number of dishes suspended from the scale-beam. When an ordinary one-dish scale is used, the poise D′ is constructed as shown in Fig. 5. This poise has simply a hook, G, pivoted to one side, which may be made to engage the stud $e$ of the sliding bar $c$ for the purpose of moving the sliding bar out on the scale, and to be disengaged from said stud when the said bar $c$ is to be left back against the end of the scale-beam.

Having thus described my invention, I claim as new and desire to secure by Letters Patent—

1. The combination of the beam B, having socket $g$, the poise D′, having horizontal slot $j$ and downwardly-projected recesses $k\ k'$, and the bolt F, made a little longer than the poise, having the lip $i$, and provided with the thumb-piece $l$, as and for the purpose specified.

2. In combination with a weighing-scale provided with several dishes, E E′ E″, suspended from its beam B, the sliding bar $c$, poise D′, and sliding bolt F, constructed, arranged, and operating in the manner substantially as described.

HOSEA WILLARD.

Witnesses:
J. H. LUCIA,
J. D. SMITH.